US008682472B2

(12) United States Patent
Yoshida

(10) Patent No.: US 8,682,472 B2
(45) Date of Patent: Mar. 25, 2014

(54) TRANSFER SYSTEM AND CONTROL METHOD OF THE SAME

(71) Applicant: DENSO CORPORATION, Kariya (JP)

(72) Inventor: Keisuke Yoshida, Nishio (JP)

(73) Assignee: DENSO CORPORATION, Kariya (JP)

( * ) Notice: Subject to any disclaimer, the term of this patent is extended or adjusted under 35 U.S.C. 154(b) by 31 days.

(21) Appl. No.: 13/672,118

(22) Filed: Nov. 8, 2012

(65) Prior Publication Data

US 2013/0123970 A1  May 16, 2013

(30) Foreign Application Priority Data

Nov. 11, 2011 (JP) ................................. 2011-247725

(51) Int. Cl.
*G06F 7/00* (2006.01)
*G06F 19/00* (2011.01)

(52) U.S. Cl.
USPC ........... 700/214; 700/213; 700/112; 700/113; 700/115; 700/116; 700/228; 700/241

(58) Field of Classification Search
None
See application file for complete search history.

(56) References Cited

U.S. PATENT DOCUMENTS

| 5,838,566 A | * | 11/1998 | Conboy et al. | ................ | 700/115 |
| 6,721,618 B2 | * | 4/2004 | Baek et al. | .................... | 700/121 |
| 7,092,779 B1 | * | 8/2006 | Conboy et al. | ................ | 700/112 |
| 2010/0203434 A1 | * | 8/2010 | Tsukinoki et al. | .............. | 430/30 |

FOREIGN PATENT DOCUMENTS

| JP | A-2002-087539 | 3/2002 |
| JP | A-2002-110766 | 4/2002 |
| JP | A-2005-225387 | 8/2005 |
| JP | A-2009-135275 | 6/2009 |
| JP | A-2011-022974 | 2/2011 |
| JP | A-2012-009584 | 1/2012 |

* cited by examiner

*Primary Examiner* — Yolanda Cumbess-Jones
*Assistant Examiner* — Yolanda Jones
(74) *Attorney, Agent, or Firm* — Posz Law Group, PLC

(57) ABSTRACT

In a transfer system, a storage data and a specific equipment data indicating a specific equipment are generated. When a transfer command indicates the specific equipment as one of a previous location and a subsequent location, a priority level of the transfer command is increased. A transfer command having a highest priority level is selected. When an available carrier that is not assigned with a transfer command is not accessible within a previous area in which the previous location of the transfer command selected belongs to, when the priority level of the transfer command selected has been increased, and when an alternative carrier that is assigned with the transfer command and is transferring without carrying the cassette is accessible within the previous area, the transfer command selected is assigned to the alternative carrier.

5 Claims, 6 Drawing Sheets

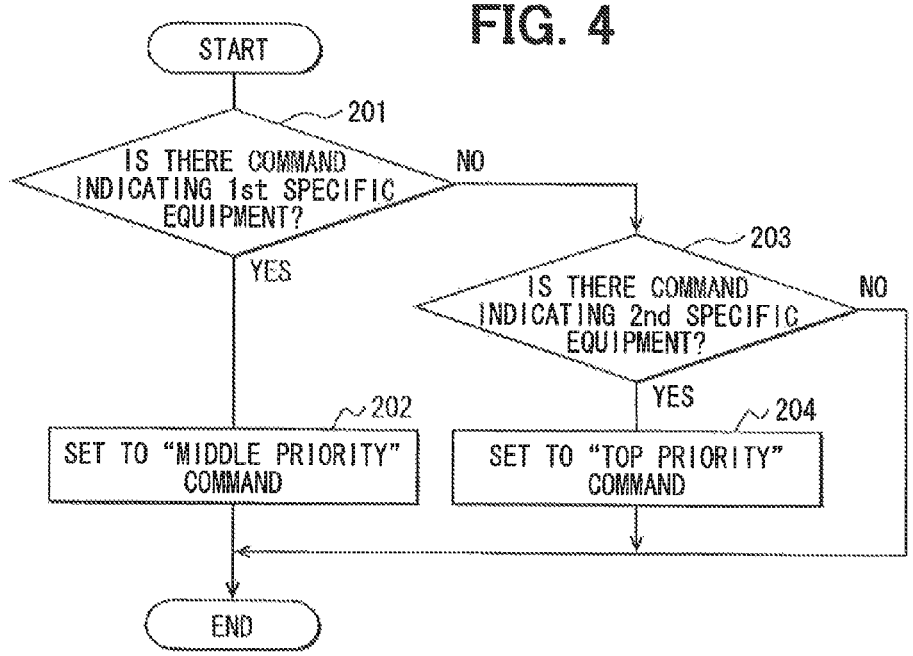

| COMMAND No. | PREVIOUS LOCATION | SUBSEQUENT LOCATION | PRIORITY |
|---|---|---|---|
| 1 | EQUIPMENT 10a | STORAGE 11a | NORMAL |
| 2 | STORAGE 11b | EQUIPMENT 10f | NORMAL |
| 3 | EQUIPMENT 10g | STORAGE 11e | NORMAL |
| 4 | EQUIPMENT 10t | STORAGE 11f | NORMAL |

FIG. 5B

| COMMAND No. | PREVIOUS LOCATION | SUBSEQUENT LOCATION | PRIORITY |
|---|---|---|---|
| 1 | EQUIPMENT 10a | STORAGE 11a | NORMAL |
| 2 | STORAGE 11b | EQUIPMENT 10f | NORMAL |
| 3 | EQUIPMENT 10g | STORAGE 11e | TOP PRIORITY |
| 4 | EQUIPMENT 10t | STORAGE 11f | MID. PRIORITY |

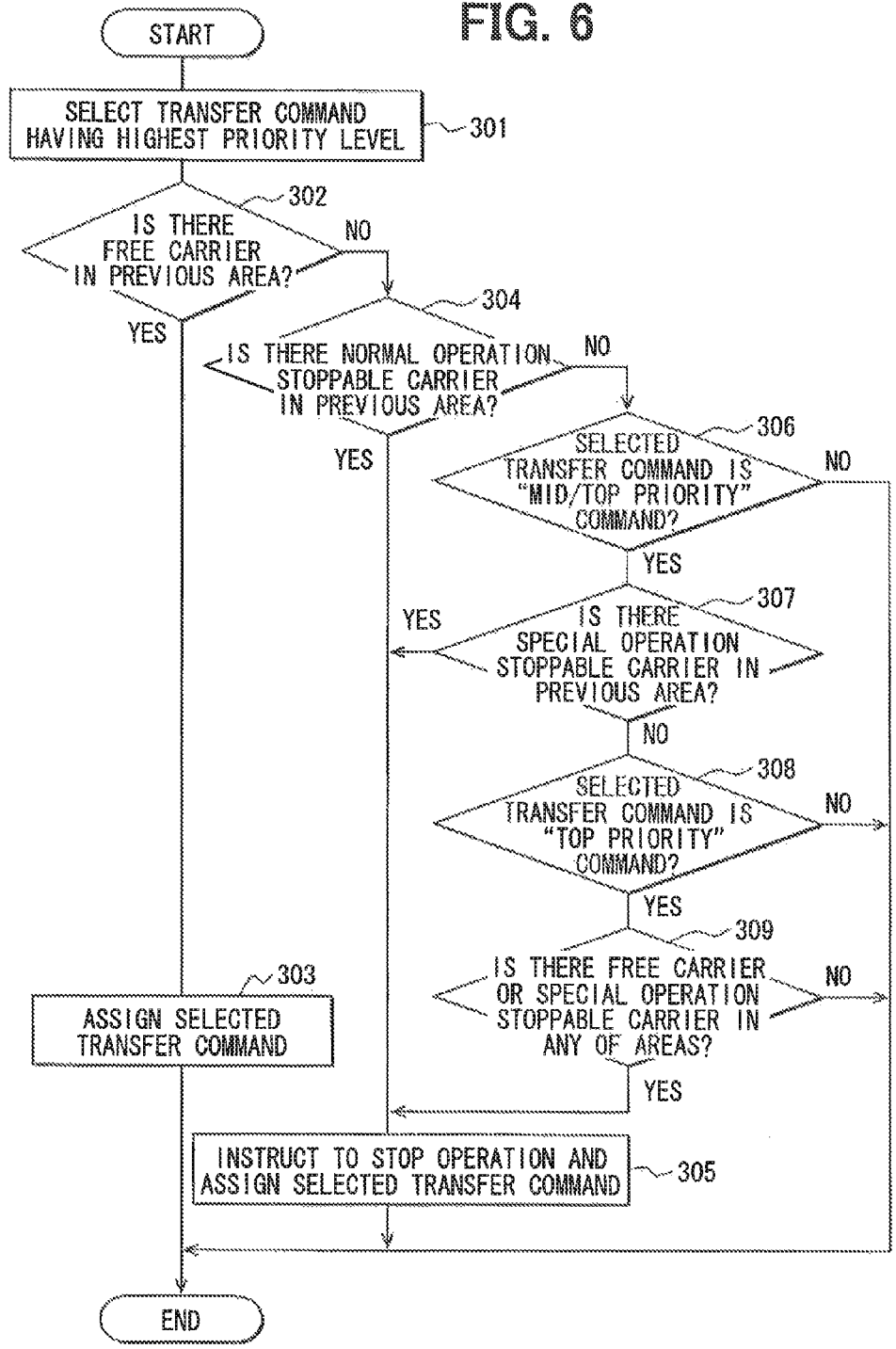

FIG. 7

| CARRIER CONDITION | AVAILABILITY TO STOP NORMAL OPERATION | AVAILABILITY TO STOP SPECIAL OPERATION |
|---|---|---|
| TRANSFERRING TO STANDBY LOCATION | AVAILABLE | AVAILABLE |
| TRANSFERRING DUE TO EXPELLING COMMAND | AVAILABLE | AVAILABLE |
| TRANSFERRING IN PREVIOUS AREA | UNAVAILABLE | AVAILABLE |
| COLLECTING CASSETTE | UNAVAILABLE | UNAVAILABLE |
| CARRYING CASSETTE TO SUBSEQUENT LOCATION | UNAVAILABLE | UNAVAILABLE |
| SUPPLYING CASSETTE TO SUBSEQUENT LOCATION | UNAVAILABLE | UNAVAILABLE |

TRANSFER SYSTEM AND CONTROL METHOD OF THE SAME

CROSS REFERENCE TO RELATED APPLICATION

This application is based on Japanese Patent Application No. 2011-247725 filed on Nov. 11, 2011, the disclosure of which is incorporated herein by reference.

TECHNICAL FIELD

The present disclosure relates to a transfer system configured to transfer cassettes accommodating processing objects, and a control method of the transfer system.

BACKGROUND

A transfer system used in a production factory, such as a production factory of semiconductor devices, has been known. For example, the transfer system includes processing equipments for processing objects, such as semiconductor wafers. The transfer system controls transfer of the objects (hereinafter referred to as the processing objects) to the processing equipments so that processing steps are sequentially performed to the processing objects in the processing equipments.

In such a transfer system, the processing objects are generally accommodated in cassettes to prevent the processing objects from being contaminated. The cassettes are carried to and collected from the processing equipments by carriers. Each of the carriers is assigned with a predetermined transfer command, The carrier transfers the cassette from one location to another location in accordance with the predetermined transfer command.

Such a transfer system further includes a storage to temporarily store the cassette. The cassette is stored once in the storage when a subsequent processing equipment to which the cassette is to be transferred next to have a subsequent processing step is processing the processing object of another cassette. When the subsequent processing equipment finishes the processing, the cassette processed is collected from the subsequent processing equipment, and the cassette that has been stored in the storage is transferred to the subsequent processing equipment to have the subsequent processing step.

In recent years, such a transfer system has been required to shorten a lead time. For example, JP 2002-110766 A describes to assign a transfer command to the carrier irrespective to whether the carrier is available to transfer the cassette. As another example, JP 2009-135275 A describes to assign a transfer command to the carrier such that the carrier arrives at the processing equipment on the time the processing of the processing equipment finishes. In the transfer systems described, however, the following issues are concerned. For example, in a general production factory of the semiconductor devices, only several or several tens of carriers are used whereas there are several hundreds of processing equipments, Therefore, it is actually difficult to transfer the carriers relative to all the processing equipments in the above described manner.

Also, periodic inspection and repairs are generally performed for the processing equipments. For example, when the processing equipment has periodic inspection or a repair, a large number of the cassettes accommodating the processing objects to be processed by this processing equipment are likely to be accumulated in the storage. In the transfer system described, the carrier is transferred to the processing equipment on time the processing finishes in the similar manner to all the processing equipments. Therefore, there is a possibility that the carrier will not be carried to the processing equipment after the periodic inspection or the repair. In such a case, the number of the cassettes accumulated in the storage increases, and cassettes, which have not been processed by the processing equipment having the periodic inspection or the repair, cannot be transferred to the storage. That is, in the transfer system described, when the processing equipment has the periodic inspection or the repair, transferring balance is likely to be deteriorated, resulting in a decrease in an operating ratio and an increase in the lead time.

SUMMARY

It is an object of the present disclosure to provide a transfer system capable of improving an operating ratio and capable of reducing a lead time, and a control method of the transfer system.

According to an aspect of the present disclosure, a transfer system includes processing equipments, carriers, a storage, a storage control section, a specific equipment determination section, a transfer command generation section, a transfer command changing section, and a carrier control section. The processing equipments are disposed in a plurality of areas, and each of the processing equipments performs a predetermined process to a processing object accommodated in a cassette. Each of the carriers transfers the cassette from one location to another location in accordance with a transfer command assigned thereto. The one location is referred to as a previous location, and the another location is referred to as a subsequent location. The storage stores the cassettes before being processed by the processing equipments. The storage control section generates a storage data indicating, for each of the processing equipments, a total number of cassettes stored in the storage to be transferred to the processing equipment. The specific equipment determination section compares, for each of the processing equipments, the total number of cassettes to be transferred to the processing equipment to a predetermined threshold. The specific equipment determination section specifies the processing equipment as a specific equipment when the total number of cassettes to be transferred to the processing equipment is equal to or greater than the predetermined threshold, and generates a specific equipment data indicating the processing equipment as the specific equipment. The transfer command generation section generates transfer commands each having the previous location and the subsequent location stored. The transfer command changing section increases a priority level of the transfer command in which one of the previous location and the subsequent location indicates the specific equipment. The carrier control section selects the transfer command having a highest priority, as a high priority transfer command, and assigns the high priority transfer command to one carrier from among the plurality of carriers. When an available carrier that has no transfer command assigned thereto is accessible within a high priority previous area, the carrier control section assigns the high priority transfer command to the available carrier, the high priority previous area being the area among the plurality of areas in which the previous location of the high priority transfer command belongs to. When the available carrier is not accessible within the high priority previous area, when the priority level of the highest priority transfer command is increased by the transfer command changing section, and when an alternative carrier that has the transfer command assigned thereto and is transferring without carrying the cassette is accessible within the high priority previous area, the carrier control section assigns the high priority transfer command to the alternative carrier. In the above transfer system, the cassettes are efficiently transferred to the specific equipment. Therefore, it is less likely that transfer balance will be further affected. Also, the transfer balance can be improved. Accordingly, the operating ratio improves, and the lead time reduces.

According to an aspect of the present disclosure, a control method of such a transfer system includes: generating a storage data that indicates, for each of the processing equipments, a total number of cassettes stored in the storage to be transferred to the processing equipment; comparing, for each of the processing equipments, the total number of cassettes to be transferred to the processing equipment to a predetermined threshold; generating a specific equipment data indicating the processing equipment having the total number of cassettes to be transferred being equal to or greater than the predetermined threshold as the specific equipment; generating transfer commands each having the previous location and the subsequent location stored; increasing a priority level of the transfer command in which one of the previous location and the subsequent location indicates the specific equipment; selecting the transfer command having a highest priority, as a high priority transfer command; and assigning the high priority transfer command to one carrier from among the plurality of carriers. In the assigning, when an available carrier that has no transfer command assigned thereto is accessible within a high priority previous area, the high priority transfer command is assigned to the available carrier, the high priority previous area being the area among the plurality of areas in which the previous location of the high priority transfer command belongs to. Further, when the available carrier is not accessible, when the priority level of the highest priority transfer command is increased by the increasing, and when an alternative carrier that has transfer command assigned thereto and is transferring without carrying the cassette is accessible within the high priority previous area, the high priority transfer command is assigned to the alternative carrier.

Accordingly, the operating ratio improves, and the lead time is reduced.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which:

FIG. 4 is a flowchart illustrating an operation of a transfer command changing section of the transfer system according to the embodiment;

FIG. 5A is a diagram illustrating transfer commands before a priority is changed by the transfer command changing section according to the embodiment;

FIG. 5B is a diagram u rating transfer commands after the priority is changed by the transfer command changing section according to the embodiment;

FIG. 6 is a flowchart illustrating an operation of a carrier control section of the transfer system according to the embodiment; and FIG. 7 is a diagram illustrating determination conditions to stop operations of carriers of the transfer system according to the embodiment.

DETAILED DESCRIPTION

Figure 1:
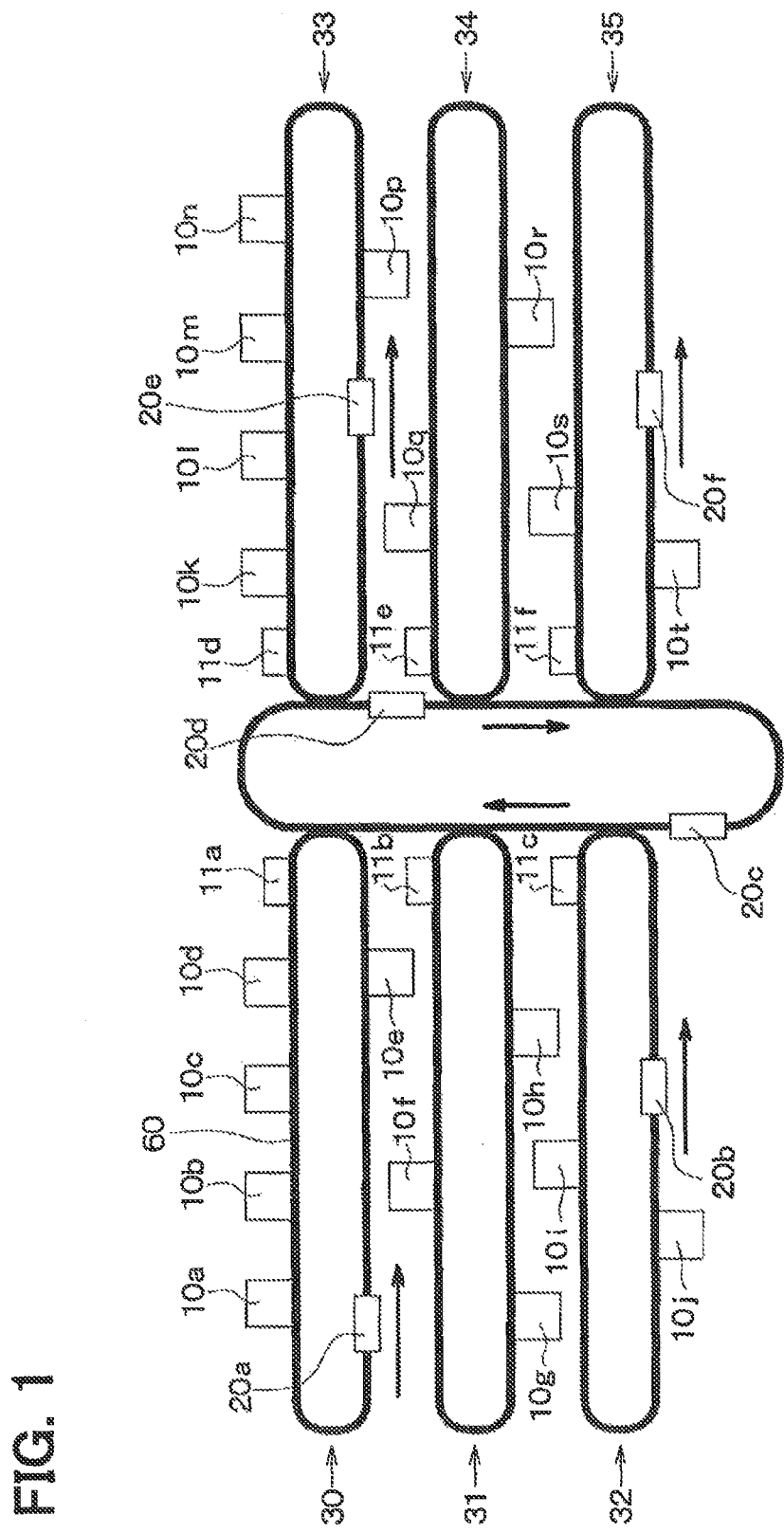
FIG. 1 is a diagram illustrating a layout of a transfer system according to an embodiment of the present disclosure.

An embodiment of the present disclosure will be described with reference to the drawings. FIG. 1 is a diagram illustrating a layout of a transfer system according to the embodiment. The transfer system according to the embodiment is exemplarily used to transfer processing objects accommodated in cassettes in a production factory, such as a production factory of semiconductor devices.

Figure 2:
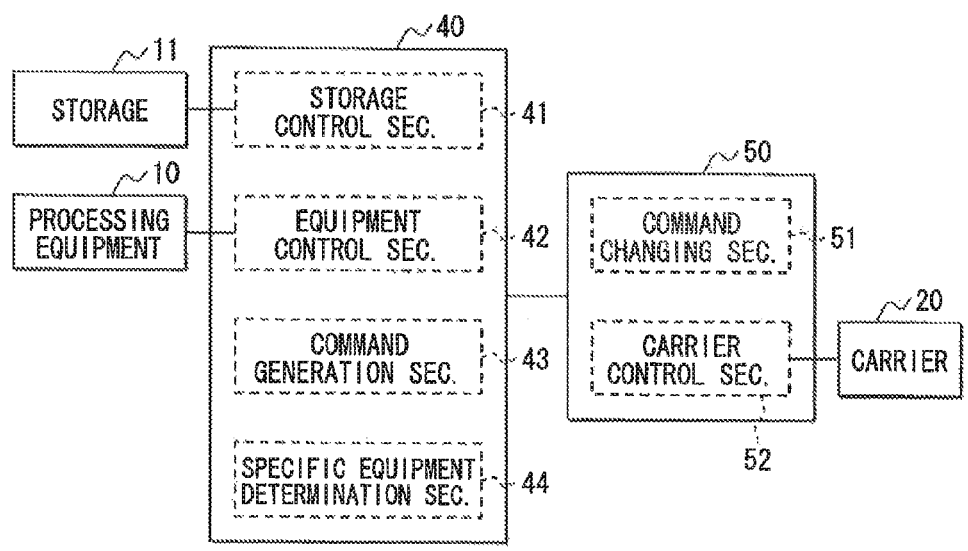
FIG. 2 is a block diagram of a host controller and a transfer controller of the transfer system according to the embodiment.

Referring to FIGS. 1 and 2, the transfer system includes multiple processing equipments 10 (e.g., 10a-10t), storages 11 (e.g., 11a-11f), carriers 20 (e.g., 20a-20f), a host controller 40, and a transfer controller 50. The storages 11 store cassettes accommodating processing objects. The carriers 20 carry the cassettes. The carriers 20 transfer the cassettes to and from the processing equipments 10 and the storages 11. In other words, each of the carriers 20 transfers the cassette from one location to another location. In the present disclosure, the one location is referred to as a previous location, and the another location is referred to as a subsequent location. For example, the previous location is one of the processing equipments 10 or one of the storages 11, and the subsequent location is one of the processing equipments 10 or one of the storages 11.

The processing equipments 10 are not limited to specific equipments. For example, when the processing object is a semiconductor wafer, the processing equipments 10 are a thermal treatment equipment, an ion implantation equipment, an etching equipment, a deposition equipment, a cleaning equipment, a photoresist applying equipment, an exposure equipment, an inspection equipment and the like.

In the present embodiment, the processing equipments 10 are disposed in first through sixth areas 30-35, In other words, the processing equipments 10 are separated in multiple equipment groups (bays). It is to be noted that, although nineteen processing equipments 10a-10t are exemplarily illustrated in FIG. 1, an actual transfer system may include about several hundreds of processing equipments.

For example, the cassette for accommodating the processing object is a generally-known standard mechanical interface (SMIF) or a front opening unified pod (FOUP). The cassette includes a main body, a lid and a flange. The main body has one face with an opening covered by the lid. The flange is equipped to the main body. The main body and the lid define an accommodation space therein to accommodate the processing object, such as a semiconductor wafer. For example, when the processing object is a semiconductor wafer, one cassette accommodates several tens of, semiconductor wafers.

Each of the carriers 20 operates in accordance with a transfer command assigned thereto. In the present embodiment, the carriers 20 are an overhead hoist transport (OHT) configured to move along a rail 60. The rail 60 is suspended from a ceiling of a factory. Each of the carriers 20 includes a holder unit and a suspension unit. The holder unit holds the flange of the cassette. The suspension unit suspends the holder unit. As the holding unit is moved up and down by raising (e.g., reeling in) or lowering (e.g., reeling out) the suspension unit, the cassette held by the holding unit is moved up and down. In this way, the carriers 20 transfer and collect the cassettes to and from the processing equipments 10 and the storages 11.

For example, the storages 11a-11f are respectively disposed in the first through sixth areas 30-35. The storages 11 store the cassettes before being processed in the respective processing equipments 10. For example, each of the storages 11 has plural storage spaces therein. Each of the storage spaces is allotted to one of the processing equipments 10 to which the cassette is to be transferred. For example, in regard to the storage 11a, a cassette that is to be transferred to the processing equipment 10a is disposed in one of the storage spaces, and a cassette that is to be transferred to the processing equipment 10b is disposed in another one of the storage spaces. Each of the storages 11 is capable of exchanging a signal with the host controller 40. Each of the storages 11 transmits stock data indicative of the number of cassettes stored in each of the storage spaces to the host controller 40.

As shown in FIG. 2, the host controller 40 includes a storage control section 41, a processing equipment control section 42, a transfer command generation section 43, and a specific equipment determination section 44. The host controller 40 periodically transmits specific equipment data, which will be described later, to the transfer controller 50 while sequentially transmitting the transfer commands to the transfer controller 50.

The storage control section 41 includes a memory unit, The memory unit stores control data indicating to which processing equipment each storage space of each of the storages 11 is allotted. In other words, the control data indicates relationships between the storage spaces of the storages 11 and the processing equipments 10.

When the storage control section 41 receives the stock data from the storages 11, the storage control section 41 calculates, for each of the processing equipments 10, a total number of cassettes stored (accumulated) in the storages 11 to be transferred to the processing equipment 10, based on the stock data while referring to the control data. Further, the storage control section 41 generates storage data indicting, for each of the processing equipments 10, the total number of cassettes to be transferred to the processing equipment 10. For example, when one of the storage spaces of the storage 11 a is provided to store the cassettes to be transferred to the processing equipment 10a, and one of the storage spaces of the storage 10b is provided to store the cassettes to be transferred to the processing equipment 10b, the total number of cassettes to be transferred to the processing equipment 10a means the total number of cassettes stored in the one of the storage spaces of the storage 11a and the one of the storage spaces of the storage 11b.

The processing equipment control section 42 exchanges a signal with each of the processing equipments 10. The processing equipment control section 42 transmits a signal indicative of a predetermined processing condition and the like to each of the processing equipments 10, to instruct the processing equipment 10 to perform a predetermined processing.

The transfer command generation section 43 reads a condition of each of the processing equipments 10, and sequentially generates the transfer commands. Each of the transfer commands has the previous location, the subsequent location and a priority level stored therein. In the present embodiment, the priority level of all the transfer commands generated by the transfer command generation section 43 is a "normal", which is the lowest priority level.

The specific equipment determination section 44 includes a memory unit. The memory unit stores, for each of the processing equipments 10, a predetermined threshold, such as a first threshold and a second threshold, relative to the total number of cassettes. The second threshold is greater than the first threshold.

The specific equipment determination section 44 acquires the storage data from the storage data control section 41. The specific equipment determination section 44 compares, for each of the processing equipments 10, the total number of cassettes to be transferred to the processing equipment 10 to the predetermined threshold. For instance, when the total number of cassettes to be transferred to a subject processing equipment 10 is equal to or greater than the predetermined threshold, the specific equipment determination section 44 specifies the subject processing equipment 10 as a specific equipment. Further, the specific equipment determination section 44 generates specific equipment data indicating the specific equipment.

In particular, the specific equipment determination section 44 determines whether the total number of cassettes to be transferred to the subject processing equipment 10 is equal to or greater than the first threshold based on the storage data acquired from the storage data control section 41. When the total number of cassettes to be transferred to the processing equipment 10 is equal to or greater than the first threshold, the specific equipment determination section 44 determines whether the total number of cassettes is equal to or greater than the second threshold. When the total number of cassettes to be transferred to the subject processing equipment 10 is equal to or greater than the second threshold, the specific equipment determination section 44 specifies the subject processing equipment 10 as a second specific equipment. When the total number of cassettes to be transferred to the subject processing equipment 10 is equal to or greater than the first threshold and is smaller than the second threshold, the specific equipment determination section 44 specifies the subject processing equipment 10 as a first specific equipment. Further, the specific equipment determination section 44 generates specific equipment data indicating the first and second specific equipments.

The specific equipment data may be generated every predetermined period or at any timing required by an operator. For example, the processing equipment 10 specified as the first specific equipment or the second specific equipment corresponds to the processing equipment 10 that had a periodic inspection or a repair. The first threshold and the second threshold may be arbitrarily changed. The first threshold and the second threshold may be set different values between the processing equipments 10.

The transfer controller 50 includes a transfer command changing section 51 and a carrier control section 52. The transfer controller 50 receives the specific equipment data from the controller 40 while sequentially receiving the transfer commands from the host controller 40.

The transfer command changing section 51 reads out the transfer command and the specific equipment data, and changes the priority level of the transfer command based on the specific equipment data. For example, the transfer command changing section 51 determines whether the specific equipment data includes the first specific equipment or the second specific equipment. When the specific equipment data includes the first specific equipment, the transfer command changing section 51 changes the priority level of the transfer command in which the previous location or the subsequent location is the first specific equipment from the "normal" to a "middle priority". When the specific equipment data includes the second specific equipment, the transfer command changing section 51 changes the priority level of the transfer command in which the previous location or the subsequent location is the second specific equipment from the "normal" to a "top priority".

Further, if the priority level of the transfer command that does not include the second specific equipment as either the previous location or the subsequent location is the "middle priority", the transfer command changing section 51 changes the priority level of the transfer command to the "normal". Also, if the priority level of the transfer command that does not include the second specific equipment as either the previous location or the subsequent location is the "top priority", the transfer command changing section 51 changes the priority level of the transfer command to the "normal".

In the present embodiment, the "top priority" is the highest priority level, and the "middle priority" is the middle priority level between the "top priority" and the "normal". In other words, the priority of the transfer commands is provided by three levels, "top priority", "middle priority", and "normal".

The carrier control section 52 is capable of exchanging a signal with each of the carriers 20. The carrier control section 52 instructs the carriers 20 to perform transfer of the cassettes by sequentially assigning the transfer commands in the order of priority. For example, when there is the transfer command indicating the "top priority", the transfer command is assigned first. Then, the transfer commands are assigned in the order of the "middle priority" and the "normal". An overall structure of the transfer system is described hereinabove.

Next, a method of controlling the transfer system will be described. Hereinafter, a description will be made in regard to a case where the transfer commands are sequentially generated, and the storage data is generated by the storage control section 41.

Figure 3:
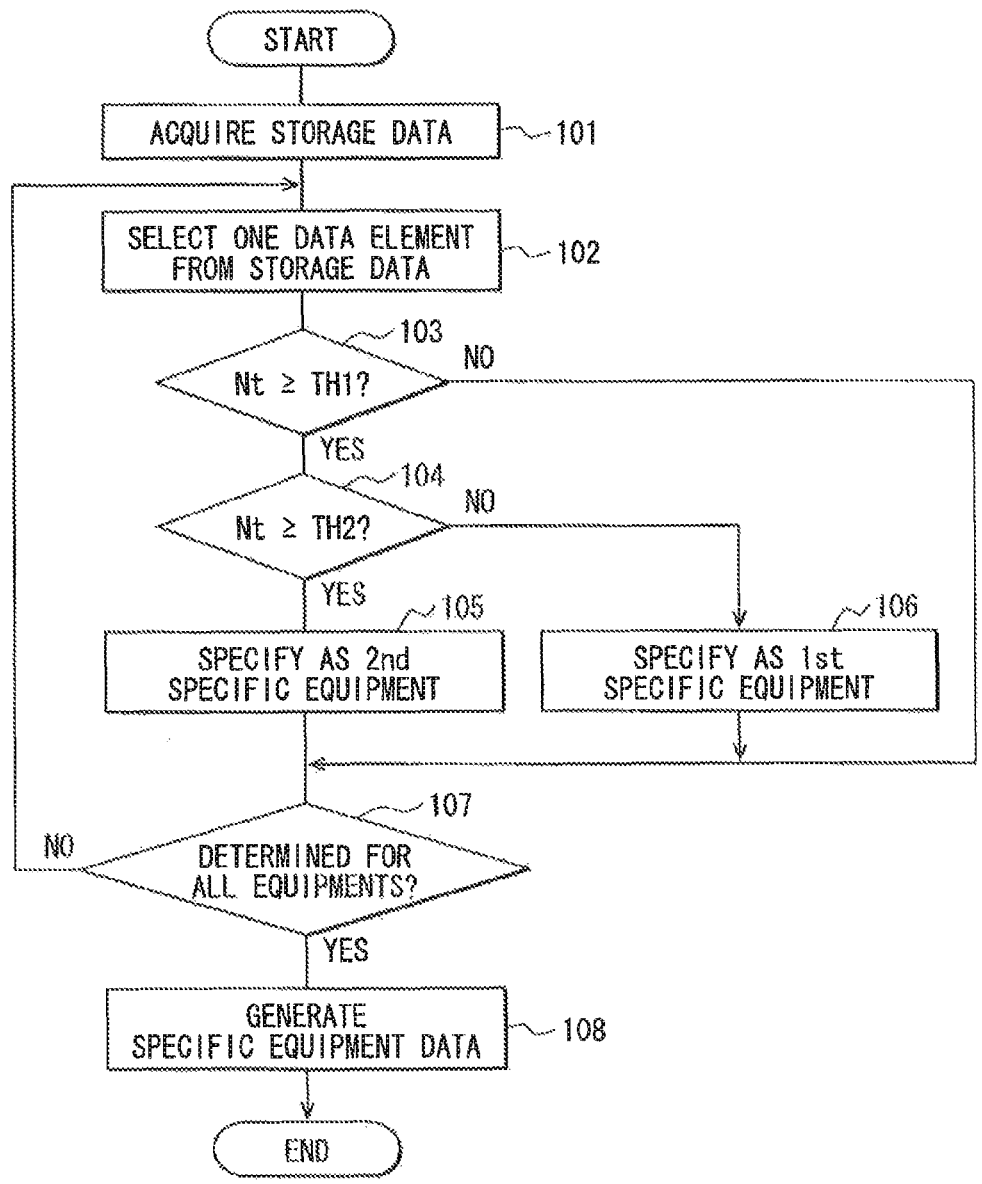
FIG. 3 is a flowchart illustrating an operation of a specific equipment determining section of the transfer system according to the embodiment.

First, an operation of the specific equipment determination section 44 will be described with reference to a flowchart of FIG. 3. As described above, the specific equipment determination section 44 starts the following operation every predetermined period, such as from 15 minutes to 30 minutes, or at any timing required by an operator.

In step 101, the specific equipment determination section 44 acquires the storage data generated by the storage control section 41. In step 102, the specific equipment determination section 44 selects one data element from the storage data acquired. The specific equipment determination section 44 selects one data element that indicates a subject processing equipment and the total number of cassettes stored in all the storages 11a-11f to be transferred to the subject processing equipment. For example, the storage data includes a data element that indicates the total number of cassettes stored in all the storages 11a-11f to be transferred to the processing equipment 10a being ten, a data element that indicates the total number of cassettes stored in all the storages 11a-11f to be processed by the processing equipment 10b being twenty, etc. The data element selected in the step 102 corresponds to data indicating the total number of cassettes before being processed by the subject processing equipment.

In step 103, the specific equipment determination section 44 determines whether the total number of cassettes (Nt) stored in the storages 11 to be transferred to the subject processing equipment is equal to or greater than the first threshold (TH1). When the total number of cassettes (Nt) is equal to or greater than the first threshold (TH1), the specific equipment determination section 44 determines, in step 104, whether the total number of cassettes (Nt) to be transferred to the subject processing equipment 10 is equal to or greater than the second threshold (TH2). When the total number of cassettes (Nt) is equal to or greater than the second threshold (TH2), the specific equipment determination section 44 specifies the subject processing equipment 10 as the second specific equipment in step 105. When it is determined that the total number (Nt) of cassettes is less than the second threshold (TH2) in step 104, the specific equipment determination section 44 specifies the subject processing equipment 10 as the first specific equipment in step 106.

In step 107, the specific equipment determination section 44 determines whether the total number of cassettes (Nt) has been determined for all the processing equipments 10. That is, the specific equipment determination section 44 determines whether all the storage data elements have been determined. When the specific equipment determination section 44 determines that the total number of cassettes (Nt) has not been determined for all the processing equipments 10a—10t, the specific equipment determination section 44 returns to the step 102. In this way, the specific equipment determination section 41 repeats this operation to determine the total number of cassettes (Nt) for all the processing equipments 10a-10t.

When the specific equipment determination section 44 determines that the total number (Nt) of cassettes has been determined for all the processing equipments 10a-10t, the specific equipment determination section 44 generates the specific equipment data in step 108. That is, the specific equipment determination section 44 generates the specific equipment data indicating the first specific equipment and the second specific equipment at a time after the threshold determination is performed for all the processing equipments 10a-10t.

The operation of the specific equipment determination section 44 is described hereinabove. It is to be noted that the host controller 40 transmits the specific equipment data to the transfer controller 50 when the specific equipment data is generated by the specific equipment determination section 44, while sequentially transmitting the transfer commands generated by the transfer command generation section 43.

Next, an operation of the transfer command changing section 51 will be described with reference to a flowchart shown in FIG. 4. The transfer command changing section 51 repeats the following operation. The transfer command changing section 51 performs the following operation by reading out the first specific equipment and the second specific equipment from the specific equipment data.

As shown in FIG. 4, in step 201, the transfer command changing section 51 determines whether there is a transfer command that indicates the first specific equipment as one of the previous location and the subsequent location. When there is the transfer command that indicates the first specific equipment as one of the previous location and the subsequent location, the transfer command changing section 51 changes the priority level of the transfer command to the "middle priority" in step 202. When the priority level of the transfer command for the first specific equipment is the "middle priority", the priority level is not changed.

In step 203, the transfer command changing section 51 determines whether there is a transfer command that indicates the second specific equipment as one of the previous location and the subsequent location.

When there is the transfer command that indicates the second specific equipment as one of the previous location and the subsequent location, the transfer command changing section 51 changes the priority level of the transfer command to the "top priority". When the priority level of the transfer command for the second specific equipment is the "top priority", the priority level is not changed.

FIG. 5A is a diagram illustrating the transfer commands before the priority level is changed by the transfer command changing section 51. FIG. 5B is a diagram illustrating the transfer commands after the priority level is changed by the transfer command changing section 51.

Hereinafter, the description will be made in regard to an example where there are four transfer commands, as shown in FIGS. 5A and 5B. In FIGS. 5A and 5B, transfer command 1 indicates that the previous location is the processing equipment 10a and the subsequent location is the storage 11a. Transfer command 2 indicates that the previous location is the storage 11b and the subsequent location is the processing equipment 10f. Transfer command 3 indicates that the previous location is the processing equipment 10g and the subsequent location is the storage 11e. Transfer command 4 indicates that the previous location is the processing equipment 10t and the subsequent location is the storage 11f.

Further, the description will be made in regard to an example where the processing equipment 10t is specified as the first specific equipment and the processing equipment 10g is specified as the second specific equipment.

In this case, the transfer command changing section 51 changes the priority level of the transfer command including the processing equipment lot (i.e., transfer command 4) from the "normal" to the "middle priority" in the step 202 of FIG. 4. Also, the transfer command changing section 51 changes the priority level of the transfer command including the processing equipment 10g (i.e., transfer command 3) from the "normal" to the "top priority" in the step 204 of FIG. 4. In this way, the transfer command changing section 51 changes the priority level of the transfer command.

Next, a control of the carrier control section 52 will be described with reference to a flowchart of FIG. 6. The carrier control section 52 repeats the following operation. The description will be made in regard to the example where there are four transfer commands 1-4 as shown in FIG. 5B.

First, in step 301, the carrier control section 52 selects the transfer command having the highest priority level from the transfer commands. For example, when there is the transfer command indicating the "top priority", the carrier control section 52 selects this transfer command. When there is no transfer command indicating the "top priority" and there is the transfer command indicating the "middle priority", the carrier control section 52 selects the latter transfer command indicating the "middle priority", When there is no transfer command indicating the "top priority" or the "middle priority", the carrier control section 52 selects the transfer command indicating the "normal" as the priority level For example, in the example having the four transfer commands as shown in FIG. 5B, the carrier control section 52 selects the transfer command 3 in the step 301.

In the present embodiment, when there are transfer commands having the same priority level; the carrier control section 52 selects the transfer command in the order of receipt. For example, when there are plural transfer commands having the "top priority", the carrier control section 52 selects one which was received prior to the other.

Next, in step 302, the carrier control section 52 determines whether there is a free carrier that is available to perform transfer in a previous area to which the previous location of the transfer command selected belongs. The step 302 is performed by determining whether the carrier in the previous area is assigned with the transfer command through signal exchange. The carrier control section 52 determines the carrier that is not assigned with the transfer command and is waiting at a predetermined location as the free carrier.

For example, when the carrier control section 52 selects the transfer command 3 of FIG. 5B, the carrier control section 52 determines whether there is the free carrier in the second area 31, which is the previous area to which the previous location (i.e., the processing equipment 10g) of the transfer command selected belongs.

When there is the free carrier in the step 302, the carrier control section 52 proceeds to step 303. In the step 303, the carrier control section 52 assigns the selected transfer command to the free carrier to instruct the free carrier to perform an operation in accordance with the transfer command assigned. When there is no free carrier in the step 302, the carrier control section 52 proceeds to step 304.

In the step 304, the carrier control section 52 determines whether there is a normal operation stoppable carrier that can stop a normal operation in the previous area to which the previous location of the selected transfer command belongs. For example, in a case where the transfer command 3 of FIG. 5B is selected, the carrier control section 52 determines whether there is the normal operation stoppable carrier in the second area 31.

When there is the normal operation stoppable carrier in the previous area in the step 304, the carrier control section 52 proceeds to step 305. The carrier control section 52 stops the normal operation stoppable carrier to perform the operation and assigns the transfer command selected to the normal operation stoppable carrier.

The normal operation stoppable carrier is determined based on determination conditions as shown in a diagram of FIG. 7. As shown in FIG. 7, the normal operation stoppable carrier includes a standby location transferring carrier and an expelled carrier. The standby location transferring carrier is a carrier that has finished the operation according to the transfer command assigned and is transferring to a predetermined standby location in a subsequent area to which the subsequent location of the transfer command assigned belongs. The expelled carrier is a carrier that is transferring to a predetermined standby location of an area other than the subsequent area in accordance with an expelling command due to the number of carriers in the subsequent area being greater than an available number. That is, the normal operation stoppable carrier is the carrier that is moving (transferring), but is not assigned with the transfer command. In other words, the free carrier determined in the step 302 and the normal operation stoppable carrier determined in the step 304 correspond to an available carrier that is not assigned with the transfer command. Further, assigning of the transfer command selected to the carrier in the step 303 and the step 305 corresponds to normal assigning of the transfer command.

In the step 304 and the step 305, when there are the standby location transferring carrier and the expelled carrier, the carrier control section 52 assigns the transfer command selected to the standby location transferring carrier. That is, when there are plural normal operation stoppable carriers, the carrier control section 52 assigns the transfer command to the carriers shown in the first and second lines of FIG. 7.

When there is no normal operation stoppable carrier in the previous area in the step 304, the carrier control section 52 determines, in step 306, whether the priority level of the transfer command selected is set to the "middle priority". That is, the carrier control section 52 determines whether the priority level of the transfer command selected is one of the "middle priority" and the "top priority".

When the transfer command selected has the "middle priority" or the "top priority" in the step 306, the carrier control section 52 determines, in step 307, whether there is a special operation stoppable carrier in the previous area of the transfer command selected. When there is the special operation stoppable carrier in the step 307, the carrier control section 52 proceeds to step 305, When there is no special operation stoppable carrier in the step 307, the carrier control section 52 proceeds to step 308.

The special operation stoppable carrier includes the carrier that can stop the normal operation (i.e., the standby location transferring carrier and the expelled carrier) and a previous area transferring carrier that is transferring to the previous location in accordance with the transfer command, as shown in FIG. 7. That is, the special operation stoppable carrier is the carrier that is moving in the previous area without carrying the cassette although the transfer command is assigned to.

The special operation stoppable carrier does not include a carrier that is collecting the cassette, that is, is performing a collection operation, a carrier that is moving to the subsequent location while carrying the cassette, that is, is performing a subsequent location transferring operation, and a carrier that is supplying the cassette to the subsequent location, that is, is performing a cassette supplying operation. This is because if these carriers are included in the special operation stoppable carrier, an overall transportation in the production factory will be adversely affected.

In the step 308, the carrier control section 52 determines whether the priority level of the transfer command selected is the "top priority". When the priority level of the transfer command selected is the "top priority", the carrier control section 52 determines, in step 309, whether there is the free carrier or the special operation stoppable carrier in any of the areas 30 - 35.

In the present embodiment, the determination whether there is the free carrier or the special operation stoppable carrier is made based on the distance from the previous area, that is, from the area closest to the previous area. Therefore, the order of the area to be determined is different according to the previous area.

For example, in a case where the transfer command 3 in FIG. 5B is selected, the previous area is the second area 31. Therefore, the carrier control section 52 firstly determines whether there is the free carrier in the first area 30. Then, when there is no free carrier in the first area 31, the carrier control section 52 determines whether there is the specific operation stoppable carrier in the first area 31. When there is no free carrier and specific operation stoppable carrier in the first area 30, the carrier control section 52 performs the similar determination for the third area 32, the fourth area 33, the sixth area 35, and the fifth area 34 in this order. For example, in a case where the transfer command 4 of FIG. 5B is selected, the previous area is the sixth area 35. Therefore, the carrier control section 52 performs the similar determination for the fifth area 34, the fourth area 33, the first area 30, the second area 31, and the third area 32 in this order.

When there is the free carrier or the special operation stoppable carrier in the step 309, the carrier control section 52 proceeds to step 305. In the step 305, the transfer command selected is assigned to the free carrier or the special operation stoppable carrier. In the step 305, when the transfer command selected is assigned to the special operation stoppable carrier, the transfer command selected is assigned after stopping the operation in accordance with the current transfer command assigned. That is, assigning the transfer command selected to the special operation stoppable carrier in the step 305 corresponds to special assigning. The carrier that is assigned with the transfer command and is moving in the previous area without carrying the cassette corresponds to an alternative carrier.

In the present embodiment as described above, when the total number of the cassettes stored in the storages 11 to be transferred to the processing equipment 10 is equal to or greater than the second threshold, the subject processing equipment 10 is specified as the second specific equipment. Also, when the total number of the cassettes stored in the storages 11 to be transferred to the subject processing equipment 10 is equal to or greater then the first threshold and less than the second threshold, the subject processing equipment 10 is specified as the first specific equipment. Further, the priority level of the transfer commands indicating the first specific equipment and/or the second specific equipment is increased, and the transfer commands are assigned to the carriers in the order of high priority level.

In a case where the normal assigning cannot be performed by the carrier control section 52, the priority level of the transfer command selected is increased to the "middle priority" or the "top priority", and there is the carrier that has been assigned with the transfer command, but is moving in the previous area without carrying the cassette, the special assigning is performed by assigning the transfer command selected to this carrier. Therefore, the carrier is efficiently transferred to the specific equipment, and the transferring balance improves. With this, the operation ratio of each processing equipment improves, and the lead time reduces.

When the special assigning cannot be performed to the carrier in the previous area, and the priority level of the transfer command is the "top priority", the available carrier or the special operation stoppable carrier is searched from all the areas. Therefore, the carriers are further efficiently transferred.

Summarizing the above embodiment, a transfer system includes processing equipments 10 (10a-10t), carriers 20 (20a-20f), a storage 11 (11a-11f), a storage control section 41, a specific equipment determination section 44, a transfer command generation section 43, a transfer command changing section 51, and a carrier control section 52. The processing equipments 10 are disposed in a plurality of areas, and each of the processing equipments 10 performs a predetermined process to a processing object accommodated in a cassette. Each of the carriers 20 transfers the cassette from one location (previous location) to another location (subsequent location) in accordance with a transfer command assigned thereto. The storage 11 stores the cassettes before being processed by the processing equipments 10. The storage control section 41 generates a storage data indicating, for each of the processing equipments 10, a total number of cassettes stored in the storage to be transferred to the processing equipment 10. The specific equipment determination section 44 compares, for each of the processing equipments 10, the total number of cassettes to be transferred to the processing equipment 10 to a predetermined threshold. The specific equipment determination section 44 specifies the processing equipment 10 as a specific equipment when the total number of cassettes to be transferred to the processing equipment 10 is equal to or greater than the predetermined threshold, and generates a specific equipment data indicating the processing equipment 10 as the specific equipment. The transfer command generation section 43 generates transfer commands each having the previous location and the subsequent location stored. The transfer command changing section 51 increases a priority level of the transfer command in which one of the previous location and the subsequent location indicates the specific equipment. The carrier control section 52 selects the transfer command having a highest priority, as a high priority transfer command, and assigns the high priority transfer command to one carrier from among the plurality of carriers. When an available carrier that has no transfer command assigned thereto is accessible within a high priority previous area, the carrier control section 52 assigns the high priority transfer command to the available carrier, the high priority previous area being the area among the plurality of areas in which the previous location of the high priority transfer command belongs to. When the available carrier is not accessible within the high priority previous area, when the priority level of the highest priority transfer command is increased by the transfer command changing section 51, and when an alternative carrier that has the transfer command assigned thereto and is transferring without carrying the cassette is accessible within the high priority previous area, the carrier control section 52 assigns the high priority transfer command to the alternative carrier.

For example, the predetermined threshold may include a first threshold and a second threshold greater than the first threshold. The specific equipment determination section 44 may compare, for each of the processing equipments 10, the total number of cassettes to be transferred to the processing equipment 10 to the first threshold. When the total number of cassettes is equal to or greater than the first threshold, the specific equipment determination section 44 may compare the total number of cassettes to be transferred to the processing equipment 10 to the second threshold. The specific equipment determination section 44 may specify the processing equipment 10 that has the total number of cassettes as equal to or greater than the second threshold as a second specific equipment, and may specify the processing equipment 10 that has the total number of cassettes as equal to or greater than the first threshold and less than the second threshold as a first specific equipment. The specific equipment determination section 44 may generate the specific equipment data indicating the first specific equipment and the second specific equipment. The transfer command changing section 51 may increase the priority level of the transfer command that has the first specific equipment as one of the previous location and the subsequent location to a first priority, and increases the priority level of the transfer command that has the second specific equipment as one of the previous location and the subsequent location to a second priority, the second priority having a higher priority level than the first priority. The carrier control section 52 may assign the high priority transfer command to the alternative carrier when the available carrier is not accessible within the high priority previous area, the high priority transfer command has a priority level of one of the first priority and the second priority, and the alternative carrier is accessible within the high priority previous area. The carrier control section 52 may assign the high priority transfer command to one of the available carrier and the alternative carrier that is accessible within any of the plurality of areas when the alternative carrier is not accessible within the high priority previous area and the high priority transfer command has a priority level of the second priority.

For example, the carrier control section 52 selects the transfer command having the highest priority as the high priority transfer command from among the transfer commands whose priority level has bee increased by the transfer command changing section 51.

(Other Embodiments)

In the embodiment described above, the three priority levels, such as the "normal", the "middle priority" and the "top priority" are used. In this case, for example, the "middle priority" corresponds to a first priority, and the "top priority" corresponds to a second priority having a higher priority level than the "first priority".

As another example, the priority may be indicated by numbers. For example, the priority level corresponding to the "normal" is indicated by numbers 1 through 80, the priority level corresponding to the "middle priority" is indicated by numbers 81 through 89, and the priority level corresponding to the "top priority" is indicated by numbers 90 through 99. When the transfer commands have the same priority level, the transfer commands may be performed in the order of large number. That is, the transfer command having the largest number may be performed first. In other words, the priority level may subdivided in each of the "normal", the "middle priority" and the "top priority".

In the embodiment described above, the transfer command generation section 43 generates the transfer commands each storing the priority level. As another example, the transfer command generation section 43 may generate the transfer commands each storing the previous location and the subsequent location, and the priority level may be added to the transfer commands in a section other than the transfer command generation section 43.

The storages 11a-11f are respectively disposed in the first through sixth areas 30-35. As another example, two or more than two storages may be disposed in each of the first through sixth areas 30-35. As further another example, the storage may be disposed for each of the processing equipments 10a-10t. As still another example, the storages 11a-11f may be disposed directly on the rail suspended from the ceiling.

In the embodiment described above, the carriers 20a-20f are not limited to the OHT. The carriers 20a-20f may be a rail guided vehicle (RGV) that travels along a rail disposed on a floor of a production factory; an automated guided vehicle (AGV) that is moved by a guide tape or the like disposed on a floor of a production factory; an overhead shuttle (OHS) that travels above a rail disposed adjacent to a ceiling of a production factory; and the like.

Use of the transfer system is not limited to transfer the semiconductor wafers accommodated in the cassettes. The transfer system may be used for any other purpose. For example, the transfer system may be adapted to a transfer system for assembling electronic components.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A transfer system comprising:
a plurality of processing equipments disposed in a plurality of areas, each of the processing equipments performing a predetermined process to a processing object accommodated in a cassette;
a plurality of carriers each transferring the cassette from one location to another location in accordance with a transfer command assigned thereto, wherein the one location is referred to as a previous location and the another location is referred to as a subsequent location;
a storage storing the cassettes before being processed by the processing equipments;
a storage control section generating a storage data indicating, for each of the processing equipments, a total number of cassettes stored in the storage to be transferred to the processing equipment;
a specific equipment determination section comparing, for each of the processing equipments, the total number of cassettes to be transferred to the processing equipment to a predetermined threshold, specifying the processing equipment as a specific equipment when the total number of cassettes to be transferred to the processing equipment is equal to or greater than the predetermined threshold, and generating a specific equipment data indicating the processing equipment as the specific equipment;

a transfer command generation section generating transfer commands each having the previous location and the subsequent location stored;

a transfer command changing section increasing a priority level of the transfer command in which one of the previous location and the subsequent location indicates the specific equipment; and a carrier control section selecting the transfer command having a highest priority, as a high priority transfer command, and assigning the high priority transfer command to one carrier from among the plurality of carriers, wherein when an available carrier that has no transfer command assigned thereto is accessible within a high priority previous area, the carrier control section assigns the high priority transfer command to the available carrier, the high priority previous area is the area among the plurality of areas in which the previous location of the high priority transfer command belongs to, and when the available carrier is not accessible within the high priority previous area, when the priority level of the highest priority transfer command is increased by the transfer command changing section, and when an alternative carrier that has the transfer command assigned thereto and is transferring without carrying the cassette is accessible within the high priority previous area, the carrier control section assigns the high priority transfer command to the alternative carrier.

2. The transfer system according to claim 1, wherein
the predetermined threshold includes a first threshold and a second threshold greater than the first threshold, the specific equipment determination section compares, for each of the processing equipments, the total number of cassettes to be transferred to the processing equipment to the first threshold, and when the total number of cassettes is equal to or greater than the first threshold, the specific equipment determination section compares the total number of cassettes to be transferred to the processing equipment to the second threshold, the specific equipment determination section specifies the processing equipment that has the total number of cassettes as equal to or greater than the second threshold as a second specific equipment, and specifies the processing equipment that has the total number of cassettes as equal to or greater than the first threshold and less than the second threshold as a first specific equipment, the specific equipment determination section generates the specific equipment data indicating the first specific equipment and the second specific equipment, the transfer command changing section increases the priority level of the transfer command that has the first specific equipment as one of the previous location and the subsequent location to a first priority, and increases the priority level of the transfer command that has the second specific equipment as one of the previous location and the subsequent location to a second priority, the second priority has a higher priority level than the first priority, the carrier control section assigns the high priority transfer command to the alternative carrier when the available carrier is not accessible within the high priority previous area, the high priority transfer command has a priority level of one of the first priority and the second priority, and the alternative carrier is accessible within the high priority previous area, and the carrier control section assigns the high priority transfer command to one of the available carrier and the alternative carrier that is accessible within any of the plurality of areas when the alternative carrier is not accessible within the high priority previous area and the high priority transfer command has a priority level of the second priority.

3. The transfer system according to claim 1, wherein the carrier control section selects the transfer command having the highest priority as the high priority transfer command from among the transfer commands whose priority level has been increased by the transfer command changing section.

4. A method of controlling a transfer system, the transfer system including:
a plurality of processing equipments disposed in a plurality of areas, each of the processing equipments performing a predetermined processing to a processing object accommodated in a cassette;
a plurality of carriers each transferring the cassette from one location to another location in accordance with a transfer command assigned, the one location being referred to as a previous location and the another location being referred to as a subsequent location; and
a storage storing the cassettes before being processed by the processing equipments,
the method comprising:
generating a storage data indicating, for each of the processing equipments, a total number of cassettes stored in the storage to be transferred to the processing equipment;
comparing, for each of the processing equipments, the total number of cassettes to be transferred to the processing equipment to a predetermined threshold;
generating a specific equipment data indicating the processing equipment having the total number of cassettes to be transferred being equal to or greater than the predetermined threshold as the specific equipment;
generating transfer commands each having the previous location and the subsequent location stored;
increasing a priority level of the transfer command in which one of the previous location and the subsequent location indicates the specific equipment;
selecting the transfer command having a highest priority, as a high priority transfer command; and
assigning the high priority transfer command to one carrier from among the plurality of carriers, wherein
when an available carrier that has no transfer command assigned thereto is accessible within a high priority previous area, the high priority transfer command is assigned to the available carrier, the high priority previous area is the area among the plurality of areas in which the previous location of the high priority transfer command belongs to, and
when the available carrier is not accessible, when the priority level of the highest priority transfer command is increased by the increasing, and when an alternative carrier that has transfer command assigned thereto and is transferring without carrying the cassette is accessible within the high priority previous area, the high priority transfer command is assigned to the alternative carrier.

5. The method according to claim 4, wherein
in the selecting, the transfer command having the highest priority is selected from among the transfer commands whose priority level has been increased by the increasing.

* * * * *